(12) United States Patent
Saggini et al.

(10) Patent No.: US 10,164,542 B2
(45) Date of Patent: Dec. 25, 2018

(54) ELECTRONIC CONVERTER, AND CORRESPONDING METHOD FOR DESIGNING A MAGNETIC COMPONENT

(71) Applicant: STMICROELECTRONICS S.R.L., Agrate Brianza (MB) (IT)

(72) Inventors: Stefano Saggini, Udine (IT); Osvaldo Enrico Zambetti, Milan (IT); Alessandro Zafarana, Milan (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 278 days.

(21) Appl. No.: 15/134,667

(22) Filed: Apr. 21, 2016

(65) Prior Publication Data

US 2017/0019032 A1    Jan. 19, 2017

(30) Foreign Application Priority Data

Jul. 15, 2015   (IT) ........................ 102015000034492

(51) Int. Cl.
*H02M 3/335* (2006.01)
*H01F 27/38* (2006.01)
(Continued)

(52) U.S. Cl.
CPC ........ *H02M 3/33546* (2013.01); *H01F 27/38* (2013.01); *H01F 3/14* (2013.01);
(Continued)

(58) Field of Classification Search
CPC ......... H02M 3/33546; H02M 3/33576; H02M 3/3378
See application file for complete search history.

(56) References Cited

U.S. PATENT DOCUMENTS

| 6,388,898 B1 * | 5/2002 | Fan ................... H02M 3/33561 363/17 |
| 6,784,644 B2 | 8/2004 | Xu et al. |
| 2013/0083575 A1 | 4/2013 | Kippley et al. |

FOREIGN PATENT DOCUMENTS

| CN | 202922079 U | 5/2013 |
| EP | 1069675 A1 | 1/2001 |

OTHER PUBLICATIONS

Chen et al.—An Improved Active Clamp Forward Converter with Integrated Magnetics, 2007 IEEE Power Electronics Specialists Conference, Jun. 17-21, 2007, Orlando, Florida, USA, pp. 377-382.

(Continued)

*Primary Examiner* — Adolf Berhane
*Assistant Examiner* — Afework Demisse
(74) *Attorney, Agent, or Firm* — Slater Matsil, LLP (57) ABSTRACT

A converter includes first and second input terminals and first and second output terminals. The converter also includes an output capacitor coupled between the first output terminal and the second output terminal, and a magnetic component having two input terminals and three output terminals. A first output terminal of the magnetic component is coupled through a first electronic switch to the second output terminal of the converter, a second output terminal of the magnetic component is coupled to the first output terminal of the converter, and a third output terminal of the magnetic component is coupled through a second electronic switch to the second output terminal of the electronic converter. In addition, the converter includes a switching stage configured to transfer current pulses from the first input terminal and the second input terminal of the converter to the two input terminals of the magnetic component.

21 Claims, 9 Drawing Sheets

(51) Int. Cl.
  H02M 3/337 (2006.01)
  H01F 3/14 (2006.01)
  H01F 38/00 (2006.01)
(52) U.S. Cl.
  CPC ..... *H01F 2038/006* (2013.01); *H02M 3/3378* (2013.01); *H02M 3/33576* (2013.01)

(56) References Cited

OTHER PUBLICATIONS

Sterk et al.—High Frequency ZVS Self-driven Full-Bridge using Full Integration of Magnetics, Twentieth Annual IEEE Applied Power Electronics Conference and Exposition, Mar. 6-10, 2005, APEC 2005, pp. 1210-1216, vol. 2.
Sun et al.—An Improved Current-Doubler Rectifier with Integrated Magnetics, Seventeenth Annual IEEE Applied Power Electronics Conference and Exposition, Mar. 10-14, 2002, APEC 2002, Dallas, Texas, USA, pp. 831-837, vol. 2.
Liu et al.—Design of Integrated LLCT Module for LLC Resonant Converter, Twentieth Annual IEEE Applied Power Electronics Conference and Exposition, Mar. 6-10, 2005, APEC 2005, pp. 362-368, vol. 1.
Jin et al.—Integrated Magnetic Self-Driven ZVS Nonisolated Full-Bridge Converter, IEEE Transactions on Industrial Electronics, May 2010, pp. 1615-1623, vol. 57, Issue. 5.
Xu, Peng—Multiphase Voltage Regulator Modules with Magnetic Integration to Power Microprocessors, Feb. 2002, Ch. 3.—Magnetic Integration for Multiphase VRMs, pp. 78-150.
Fairchild Semicondutor—AN-4153 Designing Asymmetric PWM Half-Bridge Converters with a Current Doubler and Synchronous Rectifier using FSFA-Series Fairchild Power Switched (FPS™), Fairchild Application Note AN-4153, Dec. 9, 2008, pp. 1-16, www.fairchildsemi.com.

* cited by examiner

ELECTRONIC CONVERTER, AND CORRESPONDING METHOD FOR DESIGNING A MAGNETIC COMPONENT

TECHNICAL FIELD

The present disclosure relates to electronic converters. Embodiments of the present disclosure regard approaches that enable implementation of the inductances of a current-doubler rectifier with a magnetic component.

BACKGROUND

Supply circuits, such as for example, AC/DC or DC/DC switching power supplies, are well known in the art. There are many types of electronic converters that may be divided mainly into insulated and non-insulated converters. For example, non-insulated electronic converters are converters of the buck, boost, buck-boost, Cuk, SEPIC, and ZETA types. Insulated converters are, for example, converters of the flyback, forward, half-bridge, and full-bridge types. These types of converters are well known to the person skilled in the art.

Figure 1:
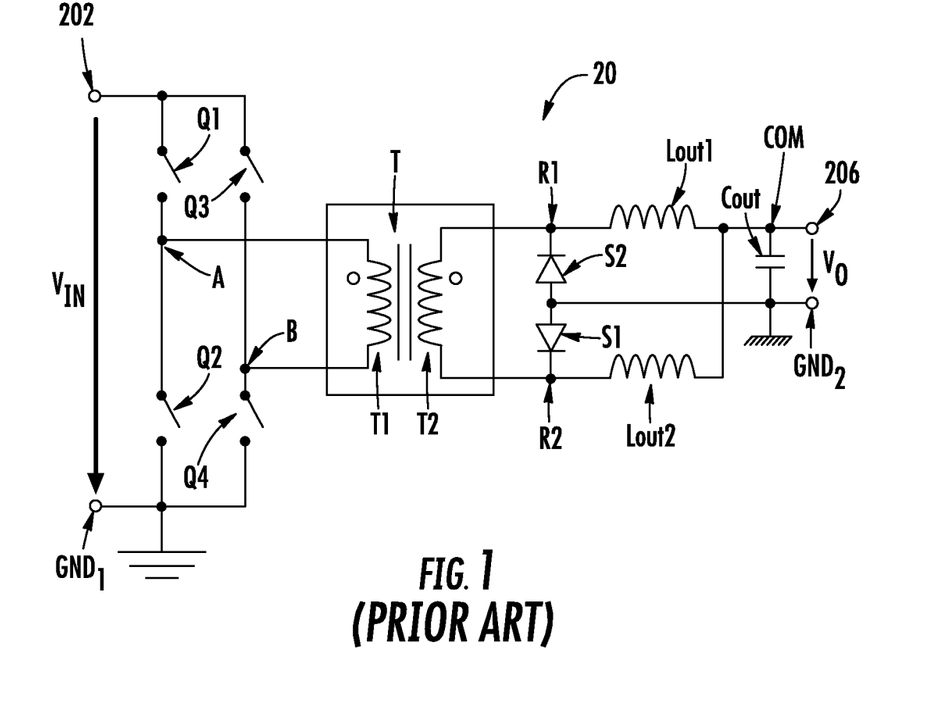
FIG. 1 is a circuit diagram of converter of the prior art.

FIG. 1 shows a possible architecture of a full-bridge converter with current doubler 20.

In particular, such a converter comprises a transformer T with a primary winding T1 and a secondary winding T2. In particular, the transformer T can be modelled as a first inductor coupled in parallel to the primary winding T1, which represents the magnetizing inductance of the transformer T, a second inductor coupled in series to the primary winding T1, which represents the leakage inductance of the transformer T, and an ideal transformer with a given turn ratio N:1.

In the example considered, the converter 20 receives a DC voltage $V_{in}$ at an input through two input terminals 202 and $GND_1$, and supplies a voltage $V_o$ at an output through two output terminals 206 and $GND_2$.

In general, the voltage $V_{in}$ may also be obtained from an AC input current, for example, via an input stage comprising a rectifier, such as a diode or a diode bridge and possibly one or more filters, such as capacitors.

In the example considered, the converter 20 comprises, on the primary side of the transformer T, an H-bridge (or full-bridge), which comprises four electronic switches Q1, Q2, Q3, and Q4, such as n-channel MOSFETs (Metal-Oxide-Semiconductor Field-Effect Transistors), which can be used for selectively connecting the two terminals of the primary winding T1 of the transformer T to the line 202 or to the ground $GND_1$.

In particular, in the example considered, the electronic switches Q1 and Q2 are coupled in series between the lines 202 and $GND_1$ and also the electronic switches Q3 and Q4 are coupled in series between the lines 202 and $GND_1$. Furthermore, the intermediate point A between the switches Q1 and Q2 is coupled to the first terminal of the primary winding T1, and the intermediate point B between the switches Q3 and Q4 is coupled to the second terminal of the primary winding T1. Consequently, an H-bridge (or full-bridge) comprises two half-bridges.

The converter 20 comprises, on the secondary side of the transformer T, a current doubler, which includes two inductors Lout1/Lout2, two diodes S1/S2, and an output capacitor Cout. The person skilled in the art will appreciate that, instead of the diodes S1/S2, in general, other electronic switches may also be used, such as, for example, n-channel MOSFETs, which are driven in an appropriate way.

In particular, the above circuit has the purpose of transferring both of the half-waves of the oscillation at the secondary T2 of the transformer T to the capacitor Cout. For this purpose, a first terminal of the secondary winding T2 is coupled, through the inductor Lout1, to the positive terminal of the capacitor Cout, i.e., the terminal 206 and the second terminal are coupled through the inductor Lout2 to the positive terminal of the capacitor Cout. The negative terminal of the capacitor Cout that represents the second ground $GND_2$, which on account of the insulating effect of the transformer T is preferably different from the ground $GND_1$ and is consequently represented with a different ground symbol, is coupled through the diode S2 to the first terminal of the secondary winding T2 and through the diode S1 to the second terminal of the secondary winding T2.

Consequently, during a positive half-wave, the current flows through the inductor Lout1, the capacitor Cout, and the diode S1, and during a negative half-wave, the current flows through the inductor Lout2, the capacitor Cout, and the diode S2.

Finally, the voltage on the capacitor Cout corresponds to the voltage $V_o$ that is supplied through the output terminals 206 and $GND_2$.

Typically, the converter 20 comprises a control unit (not shown) that drives the switches Q1, Q2, Q3, and Q4 (and possibly the switches S1/S2). The possible forms of driving such a full-bridge converter are well known in the art, and a possible type of driving is described, for example, in the paper by Douglas Sterk, et al., "*High Frequency ZVS Self-driven Full-Bridge Using Full Integration of Magnetics*", Applied Power Electronics Conference and Exposition, 2005 (APEC 2005), the contents of which are incorporated herein for reference for this purpose.

For example, these DC-DC converters are frequently driven in resonant or quasi-resonant mode, since this offers a high efficiency of conversion for input voltages $V_{in}$ (referred to as "bus voltages") higher than 12 V, and consequently these converters are frequently used in applications where the power bus voltages are, for example, 24 V, 48 V, or 400 V.

For example, frequently a first half-bridge is driven with a given duty cycle and the other half-bridge is switched at the same frequency and with a known delay, or time-shift, with respect to the first. These converters offer high efficiency because an appropriate series and/or parallel resonant network provided by dual elements (capacitance and inductance) is designed so that the switchings of the switches Q1-Q4 and preferably also the switches S1/S2 occur in conditions of zero voltage drop across them (zero-voltage switch—ZVS) and possibly also in condition of zero current flowing through them (zero-current switch—ZCS). For these conditions to be present, an accurate selection of the switching frequencies and of the time-shift is usually necessary.

Frequently, the specifications for these converters are stringent in terms of accuracy of the output voltage $V_o$. Consequently, to minimize the oscillations given by the resonance or by the switching frequency, the current doubler is provided with a second-order low-pass filter, i.e., the inductors Lout1, Lout2 and the capacitor Cout.

In general, the current-doubler rectifier (which comprises the transformer T, the inductors Lout1/Lout2, the capacitor Cout, and the switches S1/S2) can also be used in other converters. For example, the paper by Jian Sun, et al., "*An Improved Current-Doubler Rectifier with Integrated Magnetics*", Applied Power Electronics Conference and Exposition, 2002 (APEC 2002), shows that, instead of an H-bridge, a half-bridge and two capacitors may also be used. The person skilled in the art will appreciate that the choice of using a full-bridge or a half-bridge typically depends upon the power supplied by the converter 20.

Consequently, the resonant circuit of the converter 20 comprises the inductances of the transformer T, the inductors Lout1/Lout2, the capacitor Cout, and the capacitances of the switches Q1-Q4 of the half-bridge or full-bridge. The documents cited previously show in this context the possibility of integrating the transformer T and the inductances Lout1, Lout2 in a single magnetic component. For example, in FIG. 2a of the paper by Jian Sun, winding of the primary is performed in the magnetic circuit (generally provided by ferromagnetic material) on the central leg where the secondary winding is present, coupling therewith and thus providing the transformer, whereas on the lateral legs of the core the resulting magnetic flux is captured by the auxiliary windings of the secondary, thus providing the inductances Lout1 and Lout2 (inductances L1 and L2 in the paper). The remaining FIGS. 2b and 2c of the paper show similar implementations.

Consequently, it is possible to obtain in a single magnetic component the transformer T and the inductances Lout1, Lout2 according to the known art.

In general, the resonance network of the primary is given by the parasitic capacitance through the terminals of the switches of the half-bridge or full-bridge and the parasitic or leakage inductance of the transformer T. However, as explained previously, the resonance frequency is fundamental for proper operation of the circuit, and the dependence upon the leakage inductance means having a dependence of a fundamental parameter upon the variation of the manufacturing parameters of the transformer T and of the board that contains the circuit. Another disadvantage of this approach lies in the fact that the greater the leakage inductance of the transformer T, the greater also the power losses of the transformer T.

Furthermore, there are resonant converters in which proper operation of the circuit and maintenance of the ZVS conditions are ensured for a given range of values of inductance at the primary T1 and, consequently, the magnetic integration as per the known art may prove difficult because the converter may require a real inductance on the primary.

SUMMARY

The present disclosure provides approaches that enable one or more of the disadvantages outlined above to be addressed.

With a view to achieving the aforesaid object, the subject of the present disclosure is an electronic converter. Embodiments also regard a corresponding method for designing a magnetic component. Further advantageous characteristics of the embodiments are also disclosed.

As mentioned previously, one object of the present disclosure is to provide approaches that enable a magnetic circuit to be obtained that make it possible to implement the inductances of the current-doubler rectifier described previously with a magnetic component having five poles, namely, two input poles and three output poles.

For example, such a magnetic component may be used in an electronic converter that comprises two input terminals and two output terminals. In particular, the converter comprises an output capacitor coupled between the two output terminals and a switching stage, such as for example, a half-bridge or full-bridge. In this case, the magnetic component comprises two input terminals and three output terminals. The two input terminals are coupled to the switching stage, in such a way that this stage can transfer current pulses to the magnetic component. The first output terminal is coupled through a first electronic switch, such as a diode, to the second output terminal of the converter (negative terminal), the second output terminal of the magnetic component is coupled to the first output terminal of the converter (positive terminal), and the third output terminal is coupled through a second electronic switch, such as a diode, to the second output terminal of the electronic converter (negative terminal).

In various embodiments, the magnetic component is implemented via four transformers, where each transformer comprises a respective primary winding and a respective secondary winding. In particular, in various embodiments, the primary windings of the transformers are coupled in series between the two input terminals of the magnetic component. The secondary windings of the first and second transformers are coupled in series between the first and second output terminals of the magnetic component, and the secondary windings of the third and fourth transformers are coupled in series between the second output terminal and the third output terminal.

In various embodiments, the transformers are designed in such a way that their leakage inductance is low. As will be described hereinafter, in this case, the inductance between the two input terminals of the magnetic component is given mostly by the magnetizing inductances of the transformers.

In various embodiments, the first and third transformers substantially have the same turn ratio and the same magnetizing inductance, and the second and fourth transformers substantially have the same turn ratio and the same magnetizing inductance.

In general, the primary and secondary windings may be coupled together in series in different configurations. However, it is desirable for the primary windings of the transformers to have substantially the same turn ratio and the same magnetizing inductance to be coupled directly in series.

In various embodiments, the magnetic component comprises a magnetic core having a ferromagnetic material comprising four separate or detached zones, where the primary winding and the secondary winding of a respective transformer are arranged in each zone. For example, in various embodiments, these windings are obtained via stacked layers comprising a conductive or metal material.

As will be described hereinafter, the magnetic component may be modelled as an equivalent transformer with a respective turn ratio N:1 and a respective equivalent leakage inductance, and having two equivalent output inductances.

BRIEF DESCRIPTION OF THE DRAWINGS

Embodiments of the present disclosure will now be described purely by way of non-limiting example with reference to the annexed drawings, wherein:

FIG. 7b is a side elevational view of the core of the magnetic component of FIG. 7a;

FIG. 9b is a rear elevational view of the magnetic component of FIG. 9a; and FIG. 9c is a top plan view of the magnetic component of FIG. 9a.

DETAILED DESCRIPTION

In the ensuing description, various specific details are illustrated aimed at providing an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Furthermore, particular conformations, structures, or characteristics may be combined in any adequate way in one or more embodiments.

The references used herein are provided only for convenience and hence do not define the sphere of protection or the scope of the embodiments.

As mentioned previously, one object of the present disclosure is to provide approaches that enable a magnetic circuit to be obtained that makes it possible to implement the inductances of the current-doubler rectifier described previously.

Figure 2:
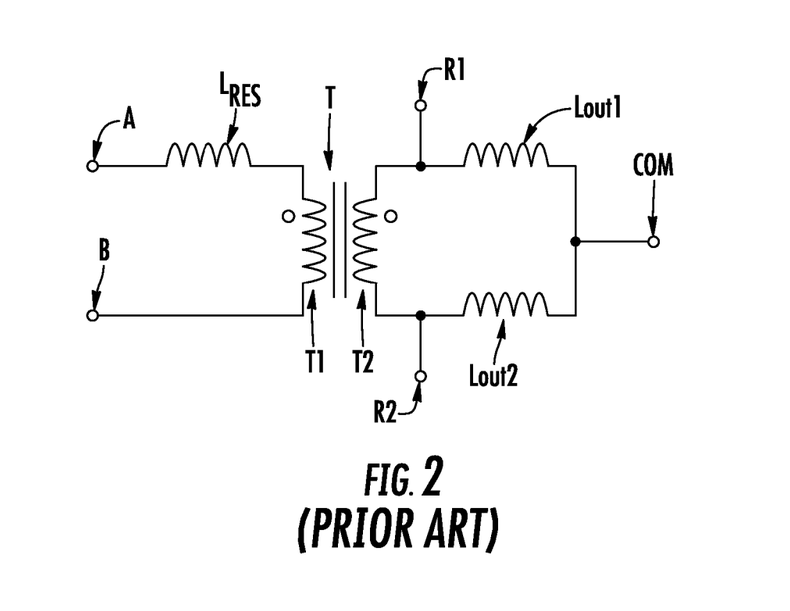
FIG. 2 shows the inductive components of the converter of FIG. 1.

FIG. 2 shows in this context the inductances of the current-doubler rectifier described with reference to FIG. 1.

In particular, also in this case, the component has two input terminals A and B that are designed to be coupled to a half-bridge or full-bridge, or in general a switching stage.

The terminals R1 and R2 are coupled to the rectifier circuits of the current doubler, i.e., the switches or diodes S1 and S2, and the terminal COM are coupled to the output voltage $V_o$, i.e., the positive terminal of the capacitor Cout, i.e., the terminal 206.

Consequently, in general, the integrated magnetic component has five terminals, namely, two input terminals and three output terminals.

If the magnetizing inductance of the transformer is disregarded, this component can be described as the equivalent of an ideal transformer having a turn ratio N:1, having at the primary winding a series inductance $L_{RES}$ that represents the leakage inductance of the transformer T, and at the secondary two inductances between the terminals R1-COM and R2-COM that have a value Lout1 and Lout2, respectively.

Figure 3:
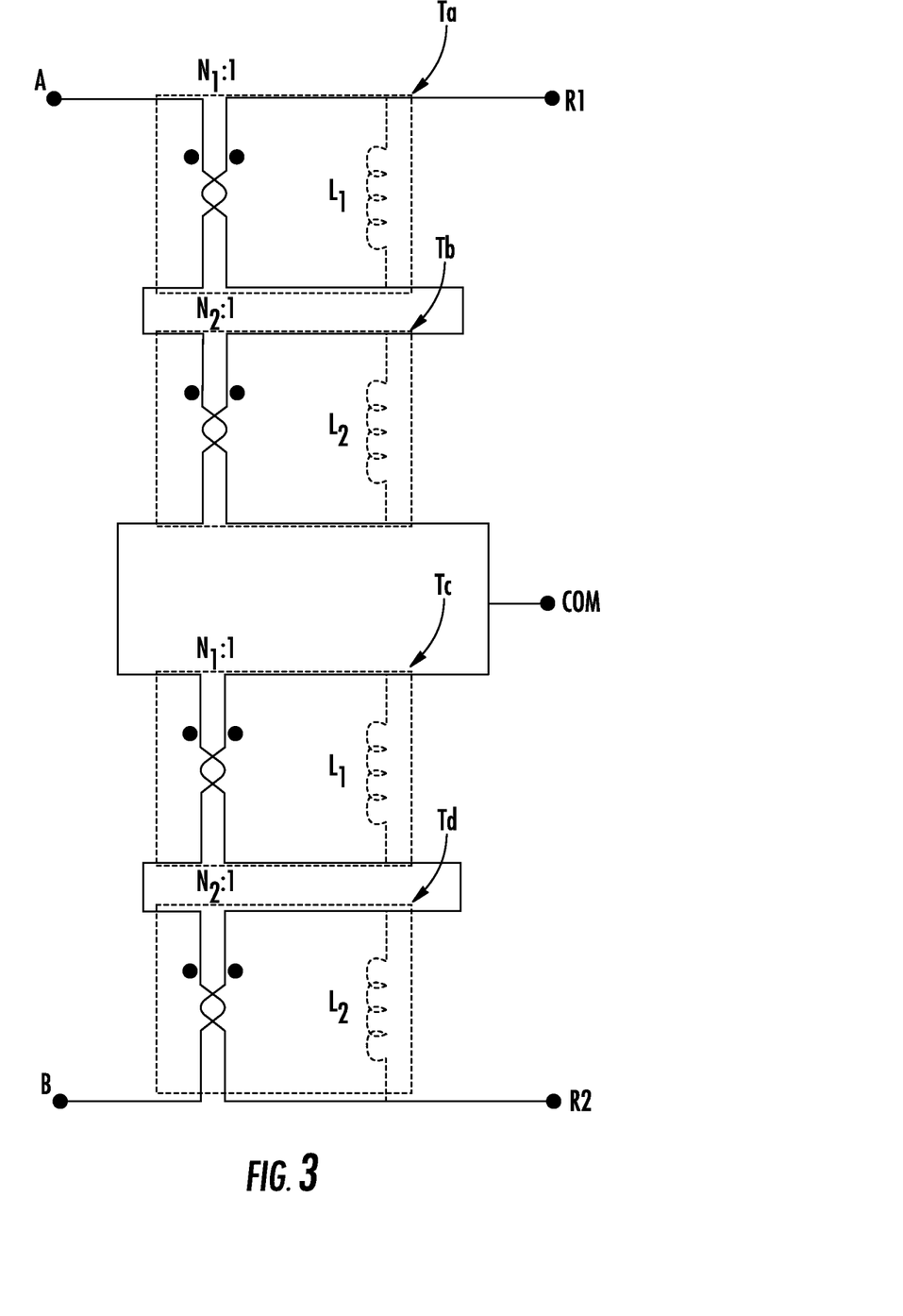
FIG. 3 is a circuit diagram of an embodiment of a magnetic component that is able to implement the inductive components of FIG. 2 according to the invention.

FIG. 3 shows a possible embodiment of an electrical circuit designed to implement the ideal component described in FIG. 2.

In particular, in the embodiment considered, the component comprises four transformers Ta, Tb, Tc, and Td.

In the embodiment considered, the primary windings of these transformers Ta-Td are coupled in series between the terminals A and B, and the secondary windings of the transformers Ta-Td are coupled in series between the terminals R1 and R2, where the intermediate point between the secondary winding of the second transformer Tb and the secondary winding of the third transformer Tc is coupled to the terminal COM.

Consequently, the transformers Ta and Tb can also be swapped around, as likewise the transformers Tc and Td. In fact, in general, it is sufficient for the primary windings of the four transformers Ta-Td to be coupled in series between the terminals A and B, for the secondary windings of the transformers Ta and Td to be coupled in series between the terminals R1 and COM, and for the secondary windings of the transformers Tc and Td to be coupled in series between the terminals R2 and COM.

In one embodiment, the circuit is made up of two types of transformers electrically modelled by a turn ratio equal to $N_1:1$ and $N_2:1$ and by their respective magnetizing inductances $L_1$ and $L_2$, i.e., their equivalent output inductances. Consequently, in the embodiment considered, it is assumed that the transformers Ta-Td are designed for having an optimal efficiency, i.e., a negligible equivalent leakage inductance, which is consequently omitted in the circuit representation, for instance, lower than 100 nH.

In particular, one of the transformers Ta or Tb is of the first type and the other is of the second type, and likewise one of the transformers To or Td is of the first type and the other is of the second type. For example, in the embodiment considered, the transformers Ta and Tc are of the first type ($N_1:1$, $L_1$) and the transformers Tb and Td are of the second type ($N_2:1$, $L_2$).

As will be described hereinafter, from this circuit it is possible to obtain the main parameters of the ideal equivalent component of FIG. 2 by using the circuit equations. In these equations (since it is a calculation of impedances seen at the terminals of the component), since the node COM is coupled to the voltage $V_o$, i.e., a node at extremely low impedance as represented in FIG. 1, it can also be replaced with the ground $GND_2$.

Figure 4A:
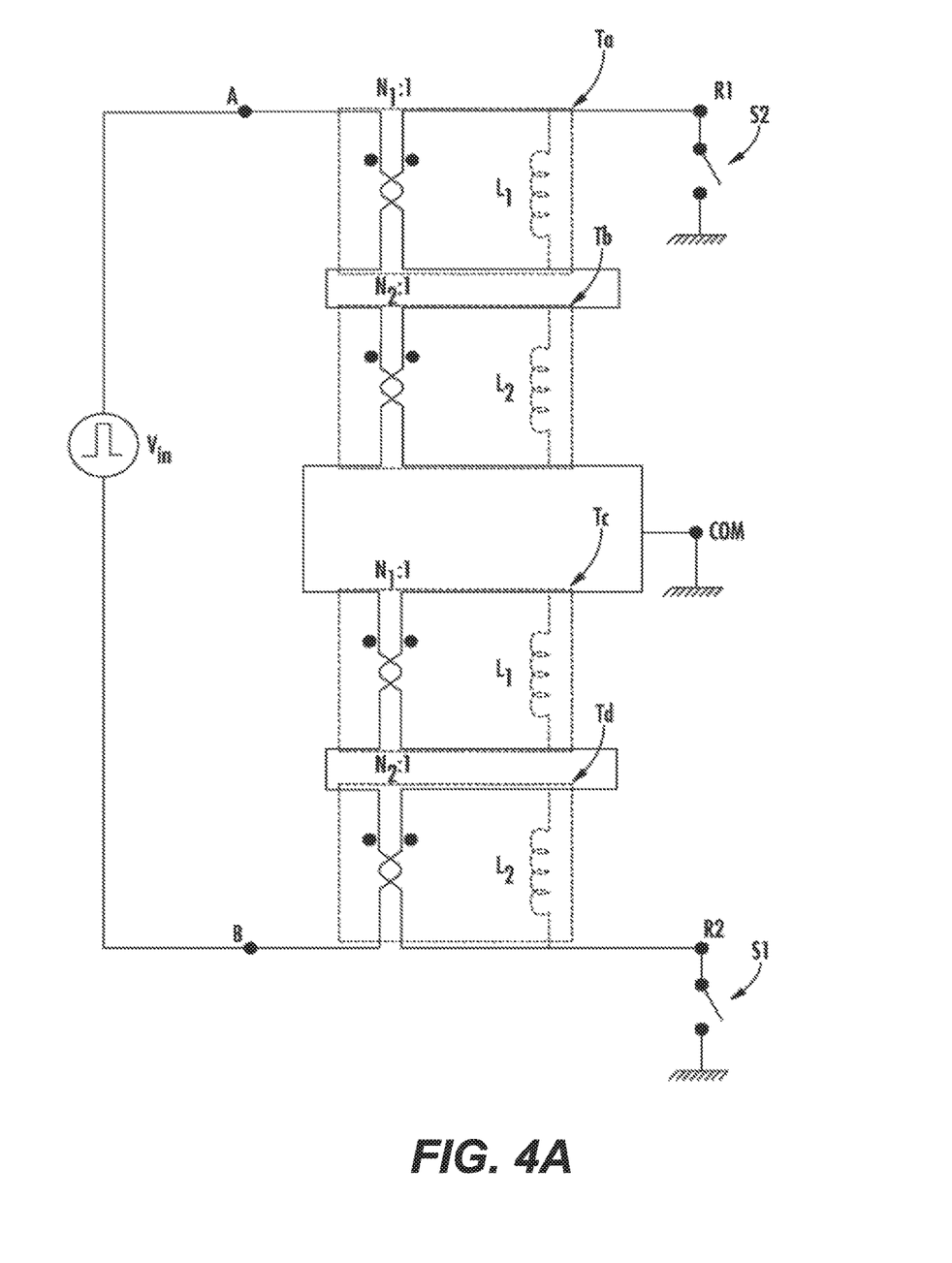
FIGS. 4A and 4B illustrate circuit diagrams of electronic converters that use the magnetic component of FIG. 3.
Figure 4B:
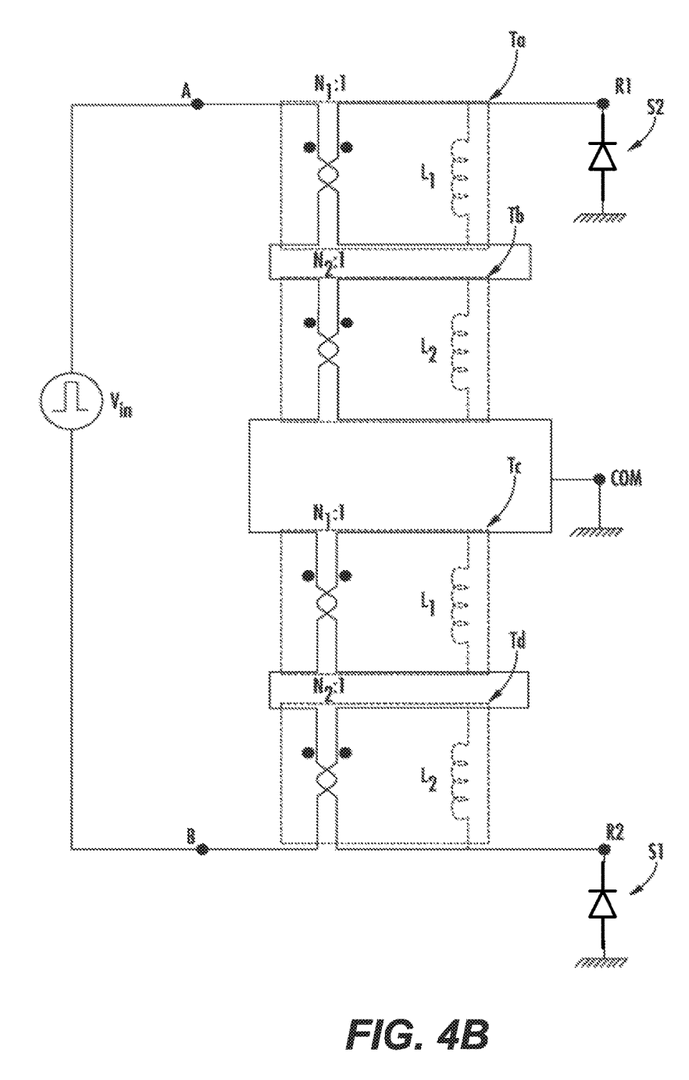

FIG. 4A shows in this context the generalized scheme of a half-bridge converter or a full-bridge converter, which substantially results from the combination of the circuit of FIG. 1 with the circuit of FIG. 3. FIG. 4B shows the circuit of FIG. 4A in which switches S1 and S2 are implemented with diodes.

On the basis of the above circuit, the circuit equations may be applied to obtain the mathematical expressions that reconstruct the parameters of FIG. 2, such as $L_{RES}$, N, Lout1, and Lout2.

In particular, during operation of the converter and according to the switching state of the switches on the primary winding (half-bridge or full-bridge) it is possible to identify two operating areas: ZVS or magnetization of the magnetic circuit, and resonance region.

ZVS and Magnetization of the Circuit

Figure 5:
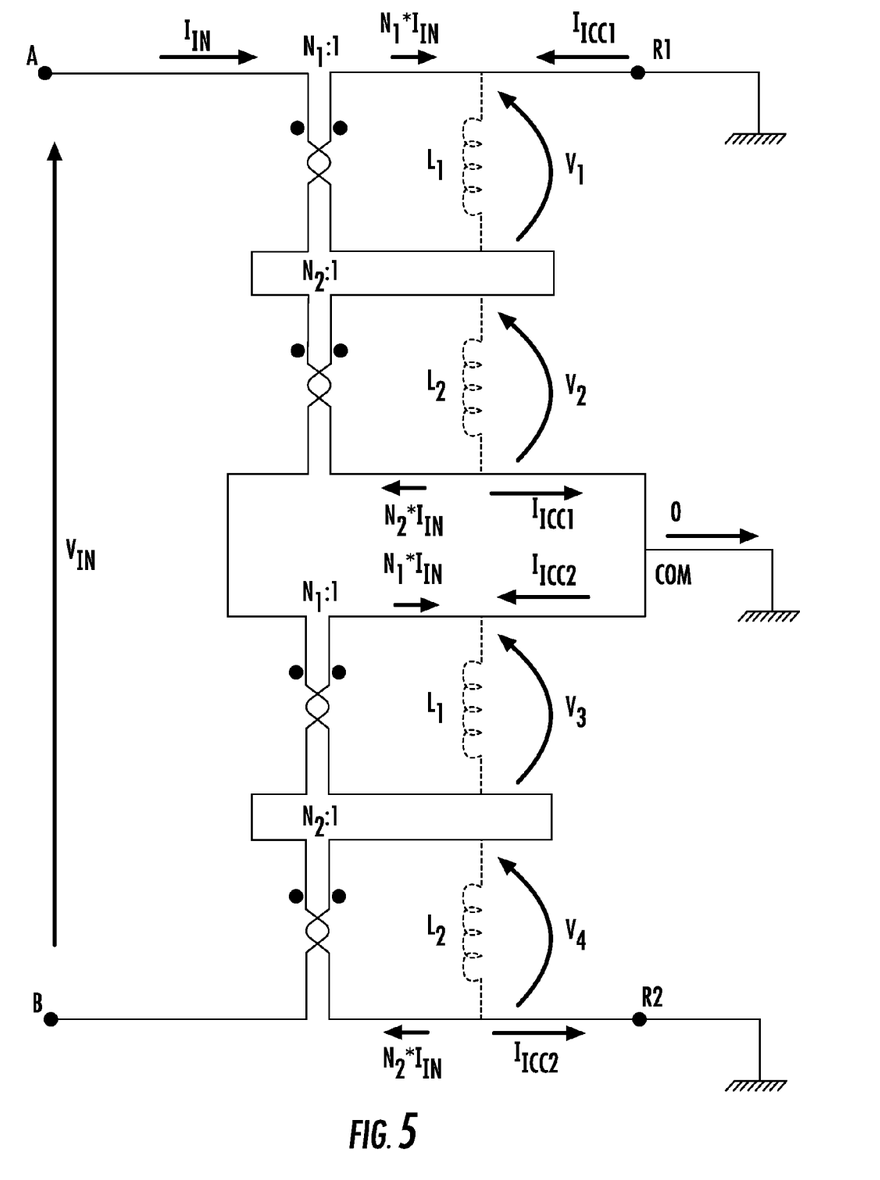
FIG. 5 shows a condition of the circuit of FIG. 4A.

As shown in FIG. 5, during this step, it is necessary to calculate the impedance at the input between the terminals A and B while the switches S1 and S2 of the current doubler are closed and hence R1 and R2 are grounded. In this case, the input impedance should be given by the resonance inductance $L_{RES}$.

Applying the circuit equation of the voltage mesh at input for the voltages $V_1$, $V_2$, $V_3$, and $V_4$ respectively across the secondary windings of the transformers Ta, Tb, Tc, and Td, will obtain $$V_{IN} = N_1 \cdot V_1 + N_2 \cdot V_2 + N_1 \cdot V_3 + N_2 \cdot V_4$$

$$V_2 = -V_1$$

$$V_4 = -V_3$$

whence $$V_{IN} = (V_1 + V_3) \cdot (N_1 - N_2)$$

Applying the circuit equation of the currents $I_{CC1}$ and $I_{CC2}$ that flow through the secondary windings of the transformers Ta/Tb and Tc/Td, respectively, will obtain $$N_1 \cdot I_{IN} + I_{CC1} = I_{L1}$$

$$N_2 \cdot I_{IN} + I_{CC1} = I_{L2}$$

$$N_1 \cdot I_{IN} + I_{CC2} = I_{L1}$$

$$N_2 \cdot I_{IN} + I_{CC2} = I_{L2}$$

From these equations it follows that $I_{CC1} = I_{CC2} = I_{CC}$ and consequently also the equalities between the voltages $V_1 = V_3$ and $V_2 = V_4$ apply so that no current generated in these conditions exits from the node COM towards the output. Hence, the equations become $$N_1 \cdot I_{IN} + I_{CC} = I_{L1}$$

$$N_2 \cdot I_{IN} + I_{CC} = I_{L2}$$

$$V_{IN} = 2 \cdot V_1 \cdot (N_1 - N_2)$$

By solving the system of equations, will obtain $$I_{IN} = \frac{I_{L1} - I_{L2}}{N_1 - N_2}$$

$$V_{IN} = 2 \cdot V_1 \cdot (N_1 - N_2)$$

$$V_1 = \frac{V_{IN}}{2 \cdot (N_1 - N_2)}$$

Passing to the s-domain, will obtain $$I_{L1} = \frac{V_1}{sL_1} = \frac{V_{IN}}{s2 \cdot L_1 \cdot (N_1 - N_2)}$$

$$I_{L2} = \frac{V_2}{sL_2} = -\frac{V_1}{sL_2} = -\frac{V_{IN}}{s2 \cdot L_2 \cdot (N_1 - N_2)}$$

and the input impedance can be calculated as follows:

$$\frac{V_{IN}}{I_{IN}} = sL_{RES} = 2 \cdot s \frac{L_1 \cdot L_2}{L_1 + L_2} \cdot (N_1 - N_2)^2$$

Hence, the equivalent inductance seen at input with the output in short-circuit is:

$$L_{RES} = 2 \cdot \frac{L_1 \cdot L_2}{L_1 + L_2} \cdot (N_1 - N_2)^2$$

Finally, the short-circuit current $I_{CC}$ is calculated that circulates in the secondary taking into consideration that the switches S1/S2 of the current doubler are closed and the poles R1/R2 are at ground. From the ratio between the currents in the secondary and in the primary winding, will obtain the equivalent turn ratio of the magnetic component (parameter N of FIG. 3).

The short-circuit current $I_{CC}$ circulating in the secondary in the s-domain is $$I_{CC} = I_{L1} - N_1 \cdot I_{IN} =$$

$$V_{IN} \cdot \frac{\frac{L_2}{L_1 + L_2} \cdot (N_1 - N_2) - N_1}{s \cdot 2 \cdot \frac{L_1 \cdot L_2}{L_1 + L_2} \cdot (N_1 - N_2)^2} = -V_{IN} \cdot \frac{N_1 \cdot L_1 + N_2 L_2}{s \cdot 2 \cdot L_1 \cdot L_2 \cdot (N_1 - N_2)^2}$$

From this relation, and substituting the expression of $L_{RES}$, will obtain $$I_{CC} = -\frac{V_{IN}}{sL_{RES}} \cdot \frac{N_1 \cdot L_1 + N_2 L_2}{L_1 + L_2}$$

The turn ratio N of the equivalent transformer is obtained as the ratio of the current in the secondary to the current in the primary winding, as follows:

$$N = \frac{I_{CC}}{\frac{V_{IN}}{sL_{RES}}} = \frac{N_1 \cdot L_1 + N_2 L_2}{L_1 + L_2}$$

Resonance Region

Figure 6:
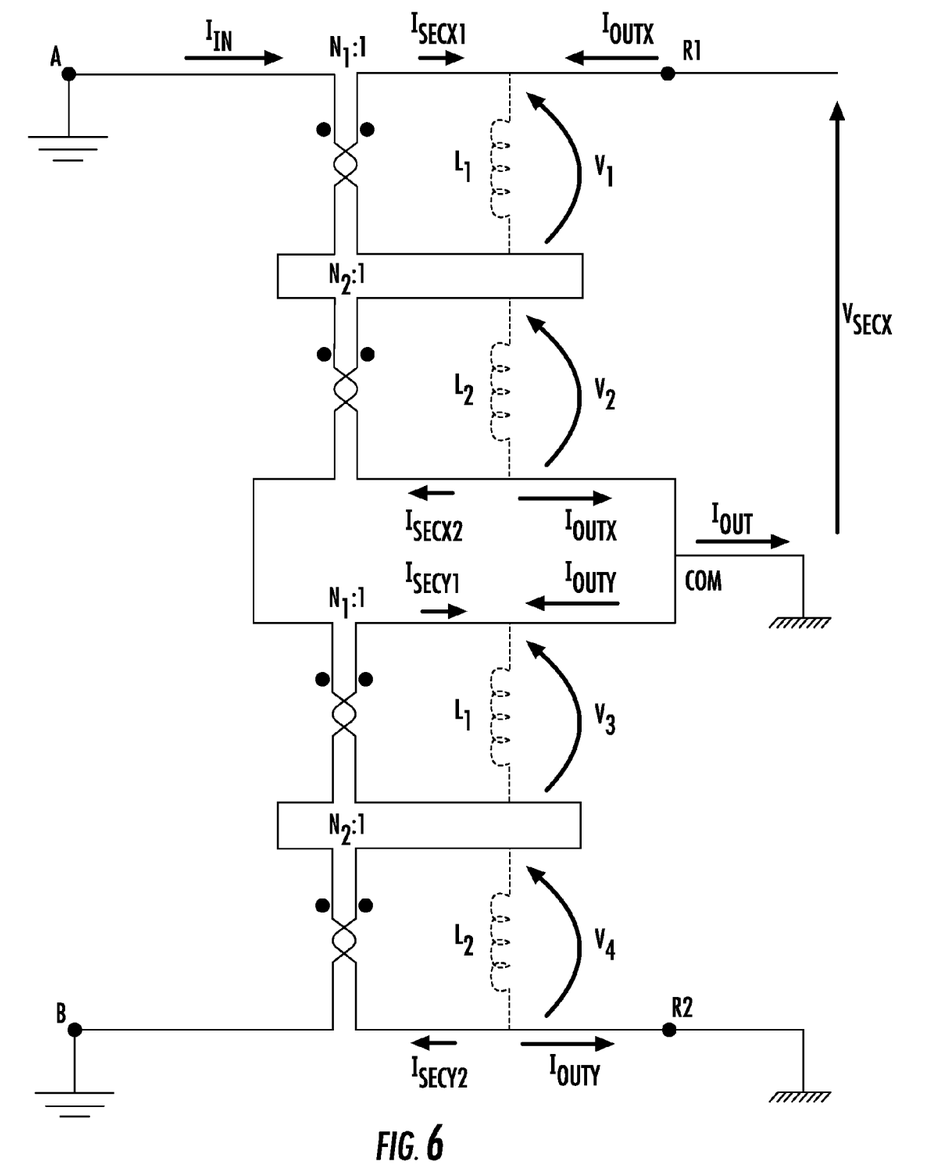
FIG. 6 shows a different condition of the circuit of FIG. 4A.

As shown in FIG. 6, during this step the converter maintains the primary side shorted, appropriately driving the half-bridge or the full-bridge, and the secondary side is open, i.e., with the switches S1 and S2 of the current doubler alternatively open. To obtain the parameters Lout1 and Lout2 with reference to FIG. 3, it is sufficient to note that at the primary winding there is no voltage drop, since the primary winding is shorted, and necessarily no current $I_{IN}$ flows in the primary winding, and the current $I_{OUTX}$ that flows through the secondary side of the transformer Ta corresponds to the current $I_{L1}$ supplied by the magnetizing inductance $L_1$. Thus, obtaining $$N_1 \cdot I_{IN} + I_{OUTX} = I_{L1}$$

$$I_{IN} = 0$$

$$I_{OUTX} = I_{L1}$$

Consequently the inductance $L_{out}$ seen at output between the terminals R1 and COM is $$V_{SECX} = V_{L1} + V_{L2}$$

$$V_{L2} = sL_2 \cdot I_{L1}$$

$$V_{SECX} = sL_1 \cdot I_{L1} + sL_2 \cdot I_{L1}$$

$$\frac{V_{SECX}}{I_{OUTX}} = s \cdot (L_1 + L_2)$$

$$L_{OUT1} = L_1 + L_2$$

where $V_{SECX}$ is the voltage between the terminals COM and R1 that is applied to the capacitor Cout, $V_{L1}$ and $V_{L2}$ are the voltages across the secondary windings of the transformers Ta and Tb, respectively, and $I_{L1}$ is the current that flows through the secondary windings of the transformer Ta, which necessarily corresponds to the current $I_{L2}$ that flows through the secondary windings of the transformer Tb.

Similar considerations apply for calculation of the output inductance $L_{out2}$ between the terminals COM and R2 on the second output branch for which the same result is obtained, by symmetry.

To sum up, the magnetic circuit behaves as represented schematically in FIG. 3 and has the following concentrated parameters:

$$L_{RES} = 2 \cdot \frac{L_1 \cdot L_2}{L_1 + L_2} \cdot (N_1 - N_2)^2$$

$$N = \frac{N_1 \cdot L_1 + N_2 L_2}{L_1 + L_2}$$

$$L_{OUT} = L_1 + L_2$$

For instance, the inductances $L_1$ and $L_2$ may be between 10 and 500 nH, preferably between 20 and 200 nH. For example, assuming an inductance $L_1$ of 45 nH and assuming an inductance $L_2$ of 75 nH, the inductances Lout1 and Lout2 would be 120 nH.

From these equations, it is also possible to appreciate an advantage of the present approach as compared to the implementations proposed in the paper by Jian Sun that are substantially based upon the use of a magnetic component with just two secondary windings. In particular, in the paper by Jian Sun, the magnetic component is designed in such a way that the inductance $L_{RES}$ on the primary side (that serves for the resonance at the primary side) will be implemented with the magnetic flux in the winding of the component, i.e., with the leakage inductance, which increases the losses of the component. In the approaches described herein, the magnetic component comprises four transformers substantially independent of one another, and the inductance $L_{RES}$ on the primary side is implemented with the magnetic flux in the core/airgap of the component, i.e., with the magnetizing inductances $L_1$ and $L_2$ of the transformers Ta, Td, as follows:

$$L_{RES} = 2 \cdot \frac{L_1 \cdot L_2}{L_1 + L_2} \cdot (N_1 - N_2)^2$$

The person skilled in the art will appreciate that the above equation applies in the case where the component comprises four transformers with the respective magnetizing inductances, i.e., $L_1$ and $L_2$>0. In this context, the phrase "substantially independent transformers" is meant to indicate a component that comprises four zones detached from one another where associated to each zone is a respective primary winding and a respective secondary winding. For example, this does not apply to the component proposed by Jian Sun, because even though the windings can be virtually divided into a number of stretches, these do not implement independent transformers.

Variation of the Parameters

In this section, the effect of the tolerances of the magnetizing inductances is determined purely by way of illustration (the turn ratios are considered deterministic). The inductances $L_1$ and $L_2$ are considered not correlated with one another.

$$\partial L_{RES} = 2 \cdot \frac{L_2^2}{(L_1 + L_2)^2} \cdot (N_1 - N_2)^2 \cdot \partial L_1 + 2 \cdot \frac{L_1^2}{(L_1 + L_2)^2} \cdot (N_1 - N_2)^2 \cdot \partial L_2$$

$$u^2(L_{RES}) =$$
$$4 \cdot \frac{L_2^4}{(L_1 + L_2)^4} \cdot (N_1 - N_2)^4 \cdot u^2(L_1) + 4 \cdot \frac{L_1^4}{(L_1 + L_2)^4} \cdot (N_1 - N_2)^4 \cdot u^2(L_2)$$

$$u(L_{RES}) = \partial L_{RES}; u(L_1) = \partial L_1; u(L_2) = \partial L_2$$

$$u_R^2(L_{RES}) = \frac{L_2^2}{(L_1 + L_2)^2} \cdot u_R^2(L_1) + \frac{L_1^2}{(L_1 + L_2)^2} \cdot u_R^2(L_2)$$

$$u_R(L_{RES}) = \frac{\partial L_{RES}}{L_{RES}}; u_R(L_1) = \frac{\partial L_1}{L_1}; u_R(L_2) = \frac{\partial L_2}{L_2}$$

Assuming the same tolerances for both of the inductances we obtain $$u_R(L_{RES}) = \frac{\sqrt{L_1^2 + L_2^2}}{(L_1 + L_2)} \cdot u_R(L)$$

Consequently, the tolerance of the inductance $L_{RES}$ is lower than the variation of the output inductance and hence the procedure for manufacturing the magnetic component.

This provides an advantage of the magnetic circuit according to the present disclosure, whereby not only is an inductance on the primary winding obtained having the desired value independent of the leakage inductance and hence of the efficiency of the transformer, but also the precision of the value of inductance is better than the one given by the manufacturing tolerances of L1 and L2.

Example of an Embodiment

Figure 7A:
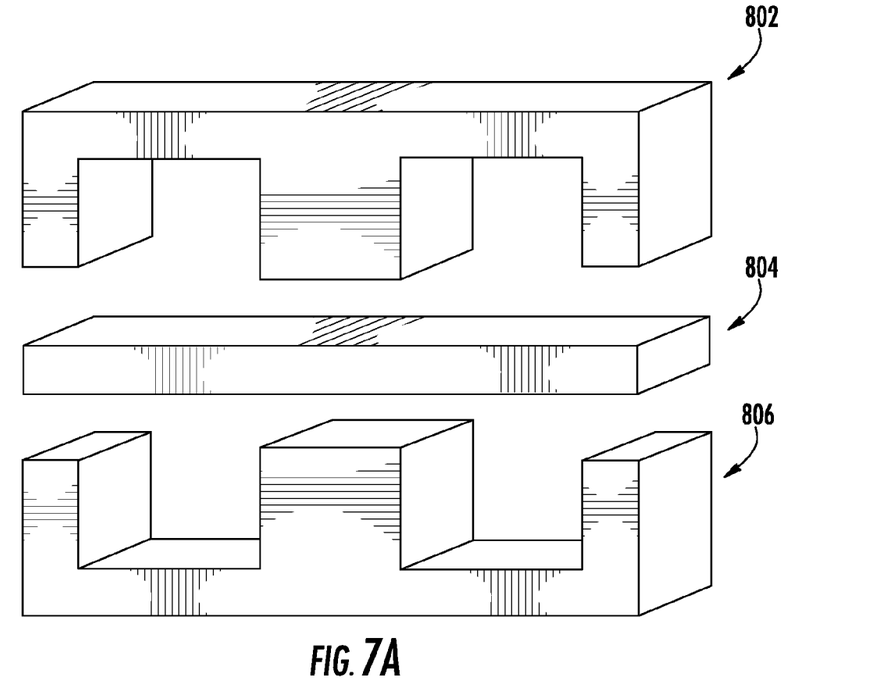
FIG. 7a is an axonometric view of a core of the magnetic component of FIG. 3.
Figure 7B:
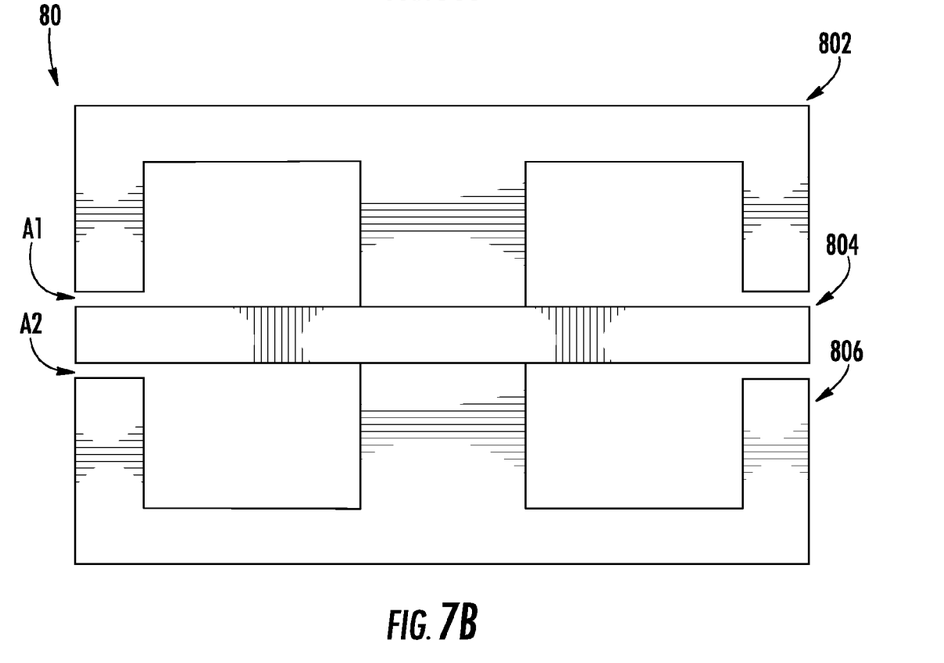

FIGS. 7a and 7b show a possible example of embodiment of a magnetic component having $N_1=2$ and $N_2=7$.

In particular, in the embodiment considered, to reduce the length of the windings and hence the power losses due to the resistance thereof, the turn ratios $N_1$ and $N_2$ can be halved. Consequently, in the embodiment considered, the transformers Ta and Td have a turn ratio 1:0.5 and the transformers Tb and Tc have a turn ratio 3.5:0.5.

In the embodiment considered, the magnetic component that implements the transformers Ta-Td is provided via a structure with layers that are positioned around a core 80.

For example, FIG. 7a is an axonometric view of a possible embodiment of the core 80. In particular, in the embodiment considered, the core 80 comprises three portions 802, 804, and 806 that can be obtained also separately and fixed together during assembly. In particular, the lateral portions 802 and 806 are shaped like an E, and the central portion 804 is a plate.

FIG. 7b shows a side view of the complete core 80. In particular, the portions 802 and 806 are configured in such a way that the core 80 has spaces A1, A2 (referred to as "airgaps") between the outer legs of the E-shaped portions (802 and 806) and the central plate 804, i.e., the lateral portions of the portions 802/806 are shorter than the central leg. These airgaps A1, A2 are designed so as to obtain the desired inductances $L_1$ and $L_2$. In particular, in the embodiment considered, the bottom airgap A2 will determine $L_1$, whereas the top airgap A1 will determine $L_2$. In various embodiments, the portions 802 and 806 have the same width, but can have different heights, i.e., the central legs can have different lengths in such a way that a different number of layers can be obtained for the portions 802 and 806.

Figure 8A:
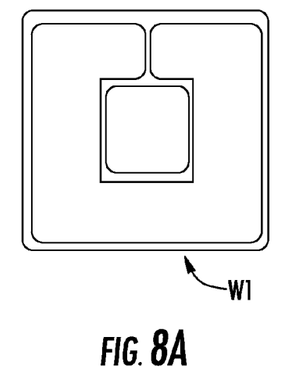
FIG. 8a illustrates layers that implement primary windings W1 of the magnetic component.
Figure 8B:
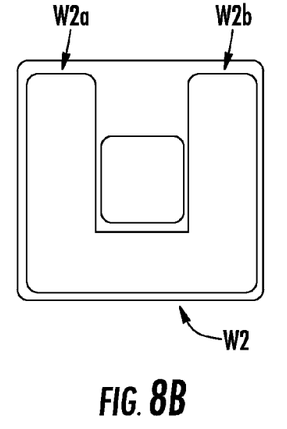
FIG. 8b illustrates layers that implement the secondary windings of the transformers Tb and Tc of the magnetic component.
Figure 8C:
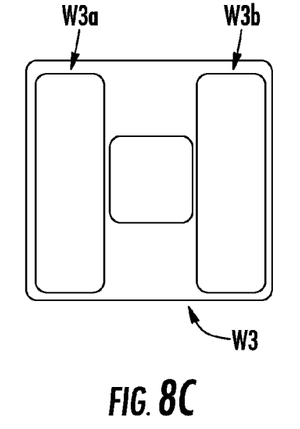
FIG. 8c illustrates layers that implement the secondary windings of the transformers Ta and Td of the magnetic component.

FIGS. 8a to 8c show possible embodiments of the layers that implement the primary windings W1 (FIG. 8a), the secondary windings of the transformers Tb and Tc designated by the reference W2 (FIG. 8b), and the secondary windings of the transformers Ta and Td designated by the reference W3 (FIG. 8c).

In the embodiment considered, the layers have a width that is smaller than the width between the lateral legs of the portions 802 and 804. Furthermore, the layers have a central opening for the central leg of the portions 802 and 804.

Figure 9A:
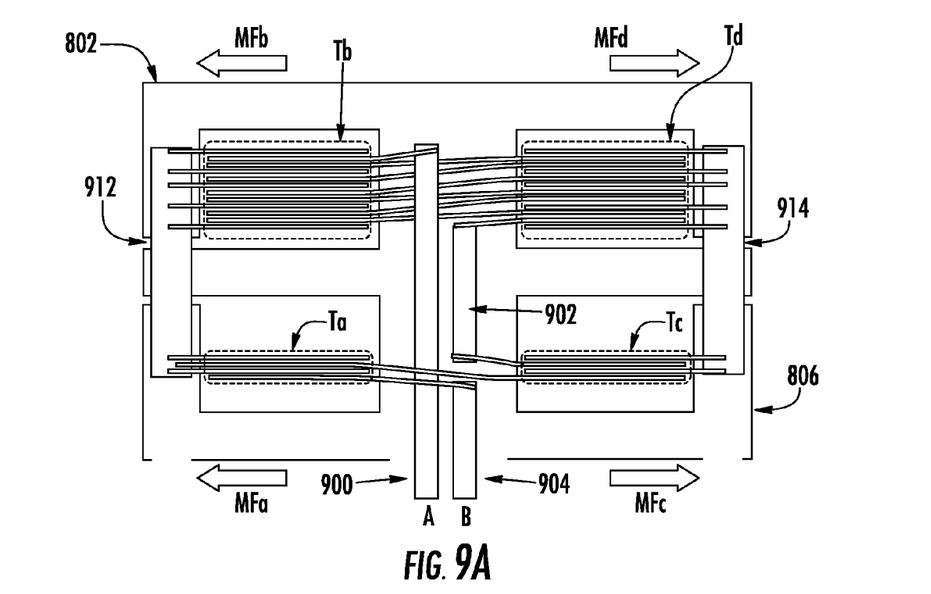
FIG. 9a is a front elevational view of an embodiment of the magnetic component.
Figure 9B:
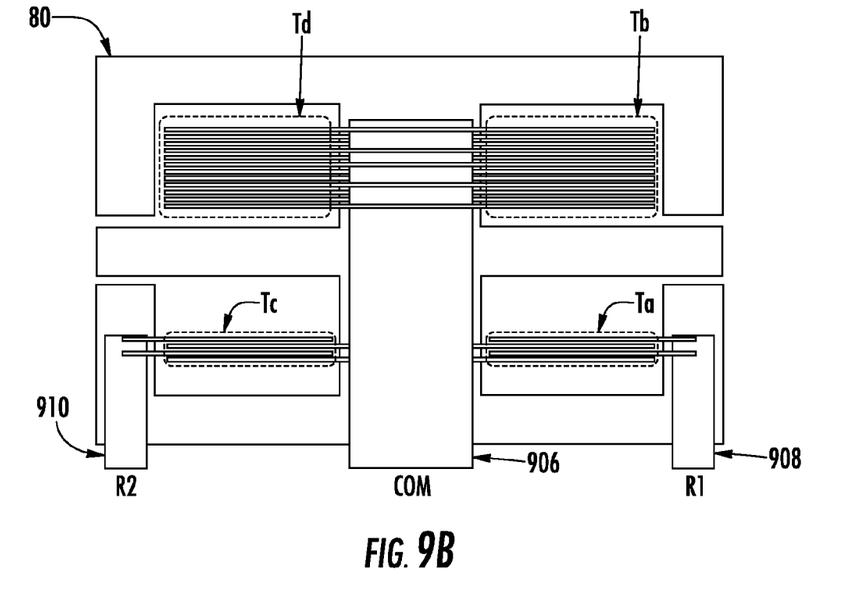
Figure 9C:
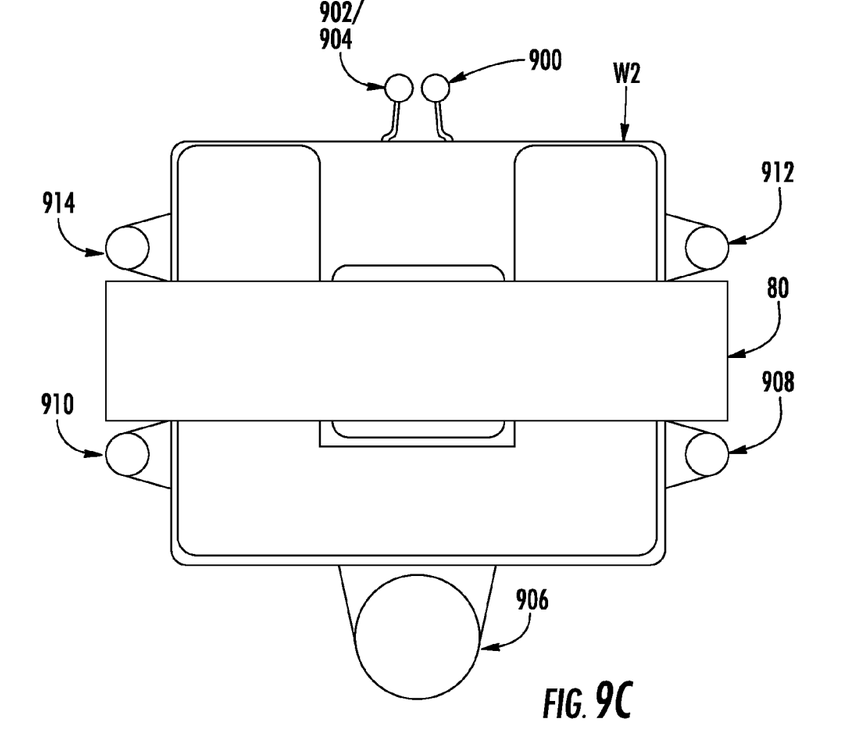

Finally, FIGS. 9a to 9c show, respectively, the view from the primary side, from the secondary side, and from above of the entire magnetic component.

In particular, in the embodiment considered, set between the portion 802 and the portion 804 of the core 80 is a layered structure that implements the transformers Tb and Td, and set between the portion 804 and the portion 806 of the core 80 is a layered structure that implements the transformers Ta and Tc. For example, the respective layers can be slid over the central leg of the portions 802 and 806, and the portions 802 and 806 can then be fixed to the central plate 804. For example, the layered structure may be obtained via a stack of printed circuit boards (PCB) or a multi-layer PCB.

For example, in the case of the number of turns referred to previously, the top layered structure comprises seven layers of the primary winding W1. In particular, the winding starts from an electrical contact 900, which is coupled to the terminal A and develops via appropriate electrical connections between the individual layers W1 around the top central leg horizontally for seven turns (see in particular FIG. 9a). The connection proceeds through a vertical electrical connection 902 and performs a further two turns around the bottom central leg with the layers W1 and is finally coupled, through an electrical connection 904, to the terminal B.

Consequently, the above windings provide the connection in series of the primary windings shown in FIG. 7, which in the specific case correspond to the sequence Tb, Td, Tc, Ta.

In particular, in the embodiment considered, the layers W1 in the bottom part are coupled together in such a way that the current flux is opposite to the current flux in the layers W1 in the top part. Consequently, as represented schematically in FIG. 9a, a current that traverses the layers W1 will generate two magnetic fluxes MFa and MFc in the bottom part, which have a direction opposite to that of the corresponding magnetic fluxes MFb and MFd generated in the top part of the core 80, and consequently there is a cancelling-out of magnetic flux, with consequent reduction of the power losses of the component.

The magnetic flux generated by the winding W1 in the top part is captured by the secondary W2, the winding of which is made up, for example, of five layers coupled in parallel, which provide together half a turn (i.e., 0.5) and are coupled via an electrical contact 906 to the central node COM (see FIG. 9b). In general, even just one layer W2 could be sufficient, but a plurality of layers coupled in parallel is advantageous to reduce the electrical resistance of the connection. For example, in the embodiment considered, the layered scheme has the structure W2, W1, W1, W2, W1, W2, W1, W1, W2, W1, W1, W2.

Consequently, the top structure provides the transformers Tb and Td with the inductance $L_2$. For this purpose, the layers W1 that provide the primary windings have shapes that envelop almost completely the central leg of the portion 802 (except for a small portion for the connections between the layers W1) in such a way as to create substantially a helix (see FIG. 9a).

In the embodiment considered, the layers W2 that provide the secondary windings of the transformers Tb and Td are obtained via two strips W2a and W2b that can also be coupled together by connection to the contact 906, i.e., the terminal COM. For example, as shown in FIG. 8b, U-shaped profiles may be used for this purpose for the layers W2.

Likewise, the magnetic flux generated by the winding W1 in the bottom part is captured by the secondary W3. In particular, in the embodiment considered, the layer W3 that provides the secondary windings of the transformers Ta and Tc in the bottom structure comprises two strips W3a and W3b that are independent; i.e., the layer comprises two lateral portions W3a and W3b that are not coupled together (as opposed to what occurs for the layer W2). Also in this case, a number of layers W3 may be provided, for example two layers, which are coupled in parallel and together provide half a turn, i.e., 0.5 turns.

The two windings W3a and W3b of the layer W3 are coupled via respective electrical connections 908 and 910 to the terminals R1 and R2 (see FIG. 9b).

Finally, two further electrical contacts 912 and 914 are provided that form the connections between the secondary windings of the transformers Ta-Td. In particular, the connection 912 connects the part W2a of the layer W2 that provides the secondary of the transformer Tb to the part W3a of the layer W3 that provides the secondary of the transformer Ta, and the connection 914 connects the part W2b of the layer W2 that provides the secondary of the transformer Td to the part W3b of the layer W3 that provides the secondary of the transformer Tc.

Consequently, in the embodiment considered, the secondary windings of the transformers Ta-Td are obtained via a single respective half turn (W2a, W2b, W3a or W3b), obtained for example via a strip of a metal material. This half turn may be obtained also from a plurality of layers coupled in parallel, for example to reduce the electrical resistance. The number of turns of the primary winding W1 in the top part and in the bottom part are sized accordingly, taking into account that a single turn of the layer W1 corresponds to half a turn for the transformer Tb and half a turn for the transformer Td, and likewise half a turn for the transformer Ta and half a turn for the transformer Tc. Consequently, the number of layers W1 coupled in series will correspond to the number $N_2$ for the top part and to the number $N_1$ for the bottom part.

Consequently, in the embodiment considered, no complex connections are required for connecting the respective portions W2a, W2b, W3a and W3b together in series (as in any case occurs for the primary winding).

Thanks to the above connection in parallel, the contacts 906, 908, 910, 912 and/or 914 can also perform a function of mechanical support for the layers. For example, in one embodiment, the contacts 900, 904, 906, 908, and 910 may be fixed with respect to the core 80, for example via a base plate, for instance made of a plastic material. In this case, the contacts 908 and 910 can support the layers W3, and the contact 906 can support the layers W2. The contacts 912 and 914 can further block the layers W2 and W3.

Of course, without prejudice to the principle of the invention, the details of construction and the embodiments may vary widely with respect to what has been described and illustrated herein purely by way of example, without thereby departing from the scope of the present invention, as defined in the ensuing claims.

For example, the person skilled in the art will appreciate that numerous variants are possible in the choice of $N_1$ and $N_2$, in the construction and alternation of the primary and secondary windings, in the determination of $L_1$ and $L_2$, which in general could be set also in some other way and not via the airgap.

The invention claimed is:

1. An electronic converter comprising:
    first and second input terminals configured to receive a first supply signal;
    first and second output terminals configured to supply a second supply signal;
    an output capacitor coupled between the first output terminal and the second output terminal;
    a first electronic switch;
    a second electronic switch;
    a magnetic component having two input terminals and three output terminals, wherein:
        a first output terminal of the magnetic component is coupled through the first electronic switch to the second output terminal of the electronic converter,
        a second output terminal of the magnetic component is coupled to the first output terminal of the electronic converter, and
        a third output terminal of the magnetic component is coupled through the second electronic switch to the second output terminal of the electronic converter; and
    a switching stage configured to transfer current pulses from the first input terminal and the second input terminal of the electronic converter to the two input terminals of the magnetic component, wherein the magnetic component comprises a plurality of transformers, each transformer having a respective primary winding and a respective secondary winding, and wherein:
        primary windings of the plurality of transformers are coupled in series between the two input terminals of the magnetic component;
        secondary windings of a first and second transformers of the plurality of transformers are coupled in series between the first output terminal of the magnetic component and the second output terminal of the magnetic component; and
        secondary windings of third and fourth transformers of the plurality of transformers are coupled in series between the second output terminal of the magnetic component and the third output terminal of the magnetic component.

2. The electronic converter according to claim 1, wherein the first transformer and the third transformer have substantially a same first turn ratio and a same first magnetizing inductance.

3. The electronic converter according to claim 2, wherein the second transformer and the fourth transformer have substantially a same second turn ratio and a same second magnetizing inductance.

4. The electronic converter according to claim 1, wherein the primary windings of the first transformer and the third transformer are coupled directly in series.

5. The electronic converter according to claim 4, wherein the primary windings of the second transformer and the fourth transformer are coupled directly in series.

6. The electronic converter according to claim 1, wherein the magnetic component comprises a magnetic core comprising four separate zones, wherein the primary winding and the secondary winding of a respective transformer of the plurality of transformers are arranged in each zone.

7. The electronic converter according to claim 6, wherein the primary and secondary windings of the plurality of transformers comprise stacked layers of conductive material.

8. The electronic converter according to claim 1, wherein the first and second electronic switches comprise diodes.

9. The electronic converter according to claim 1, wherein the switching stage comprises at least one of a half-bridge and a full-bridge.

10. The electronic converter according to claim 1, wherein the secondary windings of the first and second transformers are directly connected in series, and the secondary windings of the third and fourth transformers are directly connected in series.

11. The electronic converter according to claim 1, wherein the magnetic component comprises a magnetic core having two E-shaped portions and a central plate disposed between the two E-shaped portions, and wherein lateral portions of each of the two E-shaped portions are separated from the central plate by respective airgaps.

12. The electronic converter according to claim 1, wherein the first and third transformers are transformers of a first type, and the second and fourth transformers are transformers of a second type different from the first type.

13. An electronic converter comprising:
    first and second input terminals configured to receive a first supply signal;
    first and second output terminals configured to supply a second supply signal;
    a first diode;
    a second diode;
    a magnetic component having two input terminals and three output terminals; and
    a switching stage configured to transfer current pulses from the first input terminal and the second input terminal to the two input terminals of the magnetic component, wherein the magnetic component comprises:
        a plurality of transformers, each transformer having a respective primary winding and a respective secondary winding;
        primary windings of the plurality of transformers coupled in series between the two input terminals of the magnetic component;
        secondary windings of first and second transformers of the plurality of transformers coupled in series between a first output terminal of the magnetic component and a second output terminal of the magnetic component; and
        secondary windings of third and fourth transformers of the plurality of transformers coupled in series between the second output terminal of the magnetic component and a third output terminal of the magnetic component.

14. The electronic converter of claim 13, wherein
    the first output terminal of the magnetic component is coupled through the first diode to the second output terminal of the electronic converter,
    the second output terminal of the magnetic component is coupled to the first output terminal of the electronic converter, and the third output terminal of the magnetic component is coupled through the second diode to the second output terminal of the electronic converter.

15. The electronic converter according to claim 13, wherein the first transformer and the third transformer have substantially a same first turn ratio and a same first magnetizing inductance.

16. The electronic converter according to claim 15, wherein the second transformer and the fourth transformer have substantially a same second turn ratio and a same second magnetizing inductance.

17. The electronic converter according to claim 13, wherein the primary windings of the first transformer and the third transformer are coupled directly in series.

18. The electronic converter according to claim 17, wherein the primary windings of the second transformer and the fourth transformer are coupled directly in series.

19. The electronic converter according to claim 13, wherein the magnetic component comprises a magnetic core comprising four separate zones, wherein the primary winding and the secondary winding of a respective transformer of the plurality of transformers are arranged in each zone.

20. The electronic converter according to claim 19, wherein the primary and secondary windings of the plurality of transformers comprise stacked layers of conductive material.

21. A method of making an electronic converter having first and second input terminals and first and second output terminals, the method comprising:
coupling an output capacitor between the first output terminal and the second output terminal;
coupling a first output terminal of a magnetic component through a first electronic switch to the second output terminal of the electronic converter;
coupling a second output terminal of the magnetic component to the first output terminal of the electronic converter;
coupling a third output terminal of the magnetic component through a second electronic switch to the second output terminal of the electronic converter; and
transferring current pulses from the first input terminal and the second input terminal of the electronic converter to two input terminals of the magnetic component using a switching stage, wherein the magnetic component comprises a plurality of transformers, wherein each transformer has a respective primary winding and a respective secondary winding, and wherein:
primary windings of the plurality of transformers are coupled in series between the two input terminals of the magnetic component,
secondary windings of first and second transformers of the plurality of transformers are coupled in series between the first output terminal of the magnetic component and the second output terminal of the magnetic component, and
secondary windings of third and fourth transformers of the plurality of transformers are coupled in series between the second output terminal of the magnetic component and the third output terminal of the magnetic component.

* * * * *